(12) United States Patent
Matsunami et al.

(10) Patent No.: US 11,837,072 B2
(45) Date of Patent: Dec. 5, 2023

(54) CONTROL SYSTEM AND CONTROL METHOD

(71) Applicant: Panasonic Intellectual Property Management Co., Ltd., Osaka (JP)

(72) Inventors: Kousei Matsunami, Kyoto (JP); Kiyonori Kido, Tokyo (JP); Makoto Hiroki, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/785,653

(22) PCT Filed: Dec. 8, 2020

(86) PCT No.: PCT/JP2020/045738
§ 371 (c)(1),
(2) Date: Jun. 15, 2022

(87) PCT Pub. No.: WO2021/124993
PCT Pub. Date: Jun. 24, 2021

(65) Prior Publication Data
US 2023/0050634 A1      Feb. 16, 2023

(30) Foreign Application Priority Data

Dec. 18, 2019    (JP) ................. 2019-228323

(51) Int. Cl.
*G08B 25/00*      (2006.01)
*G06F 3/16*       (2006.01)
*G08B 13/08*      (2006.01)

(52) U.S. Cl.
CPC ............ *G08B 25/001* (2013.01); *G06F 3/16* (2013.01); *G08B 13/08* (2013.01); *G08B 25/008* (2013.01)

(58) Field of Classification Search
CPC .... G08B 25/001; G08B 13/08; G08B 25/008; G08B 25/00; G06F 3/16
See application file for complete search history.

(56) References Cited

U.S. PATENT DOCUMENTS 10,706,703 B1 *   7/2020   Barr ..................... G08B 13/08
10,922,547 B1 *   2/2021   Siminoff ............. H04N 23/661
(Continued)

FOREIGN PATENT DOCUMENTS

JP    2004-206635 A    7/2004
JP    2009-169525 A    7/2009
(Continued)

OTHER PUBLICATIONS

International Search Report dated Mar. 2, 2021 in International Patent Application No. PCT/JP2020/045738, with English translation.

*Primary Examiner* — Ojiako K Nwugo
(74) *Attorney, Agent, or Firm* — McDermott Will & Emery LLP

(57) ABSTRACT

A control system includes: an input receiver that receives an input from a user; and a controller that, if a security system is set in a notification mode, brings the input receiver into a cancellation preparation state in response to a sensor being changed to a predetermined state. The notification mode is a mode in which a notification is provided after a predetermined time period has elapsed since the sensor has changed to the predetermined state. The cancellation preparation state is a state in which a cancellation input for cancelling a setting of the notification mode is receivable. The controller cancels the setting of the notification mode when the cancellation input is received by the input receiver in the cancellation preparation state.

5 Claims, 7 Drawing Sheets

(56) References Cited

U.S. PATENT DOCUMENTS

| | | | | |
|---|---|---|---|---|
| 11,060,864 B1* | 7/2021 | Ho | ............... | G01C 11/06 |
| 2014/0160288 A1* | 6/2014 | Makaveev | ............... | H04N 7/18 |
| | | | | 348/148 |
| 2020/0119940 A1* | 4/2020 | Dawes | ............... | G08B 25/10 |

FOREIGN PATENT DOCUMENTS

| | | |
|---|---|---|
| JP | 2011-013824 A | 1/2011 |
| JP | 2011-134257 A | 7/2011 |
| JP | 2014-192595 A | 10/2014 |

* cited by examiner

CONTROL SYSTEM AND CONTROL METHOD

CROSS-REFERENCE TO RELATED APPLICATIONS

This application is the U.S. National Phase under 35 U.S.C. § 371 of International Patent Application No. PCT/JP2020/045738, filed on Dec. 8, 2020, which in turn claims the benefit of Japanese Patent Application No. 2019-228323, filed on Dec. 18, 2019, the entire disclosures of which Applications are incorporated by reference herein.

TECHNICAL FIELD

The present invention relates to a control system and a control method.

BACKGROUND ART

In recent years, security devices that monitor, using sensors, an intruder coming into a building such as an office building, a condominium, and a detached house which is subject to be monitored, and notify an irregularity to a monitoring center upon detection of the intruder by the sensors have become widely available. Patent Literature (PTL) 1 discloses a security device that monitors an unwarranted intrusion into a building when the security device is set in an alert mode.

CITATION LIST

Patent Literature

[PTL 1] Japanese Unexamined Patent Application Publication No. 2011-013824

SUMMARY OF INVENTION

Technical Problem

The present invention provides a control system and a control method which are capable of assisting a user in promptly cancelling a setting of an alert mode (hereinafter, also referred to as a notification mode).

Solution to Problem

A control system according to one aspect of the present invention includes: an input receiver that receives an input from a user; and a controller that, if a security system is set in a notification mode, brings the input receiver into a cancellation preparation state in response to a sensor being changed to a predetermined state, the notification mode being a mode in which a notification is provided after a predetermined time period has elapsed since the sensor has changed to the predetermined state, the cancellation preparation state being a state in which a cancellation input for cancelling a setting of the notification mode is receivable. The controller cancels the setting of the notification mode when the cancellation input is received by the input receiver in the cancellation preparation state.

A control method according to one aspect of the present invention is a control method to be executed by a computer. The control method includes: if a security system is set in a notification mode, bringing an input receiver that receives an input from a user into a cancellation preparation state in response to a sensor being changed to a predetermined state, the notification mode being a mode in which a notification is provided after a predetermined time period has elapsed since the sensor has changed to the predetermined state, the cancellation preparation state being a state in which a cancellation input for cancelling a setting of the notification mode is receivable; and cancelling the setting of the notification mode when the cancellation input is received by the input receiver in the cancellation preparation state.

A recording medium according to one aspect of the present invention is a non-transitory computer-readable recording medium for use in a computer, the recording medium having a computer program recorded thereon for causing the computer to execute the control method.

Advantageous Effects of Invention

A control system and a control method according to the present invention can assist a user in promptly cancelling a setting of a notification mode.

DESCRIPTION OF EMBODIMENTS

Hereinafter, embodiments will be described in detail with reference to the drawings. Note that the embodiments below each describe a general or specific example. The numerical values, shapes, materials, structural elements, the arrangement and connection of the structural elements, steps, orders of the steps, etc. presented in the embodiments below are mere examples, and are not intended to limit the present invention. Furthermore, among the structural elements in the embodiments below, those not recited in any one of the independent claims will be described as optional structural elements.

Note that the drawings are schematic diagrams, and do not necessarily provide strictly accurate illustration. Throughout the drawings, the same numeral is given to substantially the same structural element, and redundant description may be omitted or simplified.

[Embodiment]
[Configuration]

Figure 1:
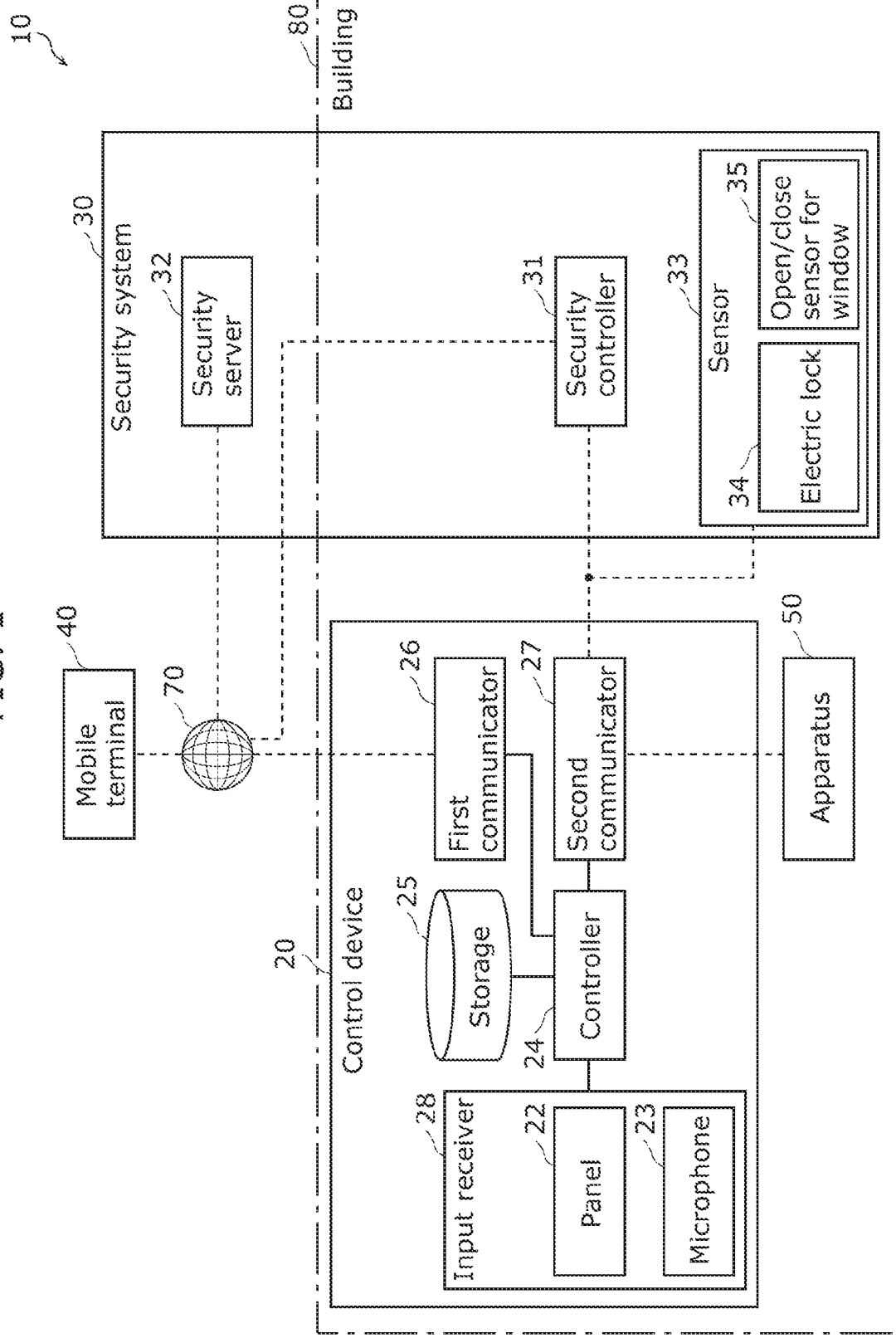
FIG. 1 is a block diagram illustrating a functional configuration of a control system according to an embodiment.

First, a configuration of a control system according to an embodiment will be described. FIG. 1 is a block diagram illustrating a functional configuration of the control system according to the embodiment.

As illustrated in FIG. 1, control system 10 includes control device 20, security system 30, mobile terminal 40, and apparatus 50.

Building 80 illustrated in FIG. 1 is, for example, a home such as an apartment or a detached house. Within building 80, control device 20, apparatus 50, and security controller 31 and sensors 33 of security system 30 are provided. Security system 30 includes security server 32 that is realized as the cloud (in other words, a cloud server).

First, control device 20 will be described. Control device 20 is, for example, a home energy management system (HEMS) controller having an energy management function. Control device 20 is provided inside building 80, and manages the electric power consumption of apparatus 50 provided inside building 80. Moreover, control device 20 obtains and displays a state of apparatus 50, and controls apparatus 50 provided inside building 80 (or within premises of building 80), for example. Control device 20 is not limited to a HEMS controller. Control device 20 may be another home controller having no energy management function, or a gateway device.

Note that apparatus 50 is, for example, a home appliance such as a lighting device and an air conditioner. States of apparatus 50 indicate, for example, operation states of apparatus 50 and electric power consumption states of apparatus 50. Specifically, the operation states include, for example, a power-ON state, a power-OFF state, and a state of a setting (e.g., a set temperature if apparatus 50 is an air conditioner, and brightness if apparatus 50 is a lighting device). Specifically, control device 20 includes panel 22, microphone 23, controller 24, storage 25, and first communicator 26, and second communicator 27. Panel 22 and microphone 23 are included in input receiver 28.

Panel 22 receives an operation input from a user. Moreover, panel 22 displays an image based on the control of controller 24. In other words, panel 22 has a display function, and a touch input function of receiving a manual input from a user. Specifically, panel 22 is realized by a display panel and a touch panel. The touch panel is, for example, a capacitive touch panel, but may be a resistive touch panel. The display panel is, for example, a liquid crystal panel or an organic electro luminescence (EL) panel.

Microphone 23 receives a voice input from a user. Microphone 23 is one example of a voice obtainer.

Controller 24 controls display of an image to be displayed on panel 22, and voice recognition processing performed on a voice that is input to microphone 23. Controller 24 is realized by a microcomputer, but may be realized by a processor.

Storage 25 is a storage device that stores a control program and the like executed by controller 24. Storage 25 is realized by, for example, a semiconductor memory.

First communicator 26 is a communication module (communication circuit) for control device 20 to communicate with security server 32 via wide area network 70 such as the Internet. Communication performed by first communicator 26 is, for example, wireless communication, but may be wired communication. A communication standard used for the communication is not particularly limited.

Second communicator 27 is a communication module (communication circuit) for control device 20 to communicate with security controller 31, apparatus 50, and sensors 33 via a local communication network. Communication performed by second communicator 27 is, for example, wireless communication, but may be wired communication. A communication standard used for the communication is not particularly limited. Note that the communication between second communicator 27 and apparatus 50 adheres to, for example, ECHONET Lite (registered trademark).

Next, security system 30 will be described. Security system 30 is a crime prevention system for performing predetermined information processing to address occurrences of irregularities in building 80. The predetermined information processing is, for example, information processing for notifying an occurrence of an irregularity to a user, and information processing for making an arrangement for a visitor to visit building 80. Security system 30 is managed by, for example, a business that provides home security services and the like. Specifically, security system 30 includes security controller 31, security server 32, and sensors 33.

Security controller 31 receives, from a user, an operation for setting security controller 31 in a notification mode. Security controller 31 communicates with security server 32 using wide area network 70. Moreover, security controller 31 communicates with control device 20 and sensors 33 using the local communication network.

When sensor 33 detects an intruder coming into building 80 and a setting of the notification mode is not cancelled even after a predetermined time period has elapsed since the intruder has been detected when security controller 31 is set in the notification mode, security controller 31 estimates that an irregularity has occurred in building 80, and provides a notification of an occurrence of an irregularity to security server 32.

When the irregularity is notified from security controller 31 to security server 32, an operator of a business managing security system 30 arranges a visitor, and the visitor rushes to building 80. In addition, the operator reports to the police and the like as necessary. In this embodiment, an operator means a person who operates a computer and the like.

Sensors 33 detect an intruder coming into building 80 if security system 30 is set in the above-mentioned notification mode. Sensors 33 are, for example, security devices. Sensors 33 (security devices) include, for example, electric lock 34 that detects the open state and the closed state of a door, and open/close sensor 35 for a window that detects the open state and the closed state of a window. Sensors 33 may include a human detection sensor, a glass break sensor, and the like. Electric lock 34 has the following two states: the unlocked state and the locked state. Open/close sensor 35 for a window has the following two states: the state in which the window is open and the state in which the window is closed. Note that open/close sensor 35 may be an open/close sensor for a door.

[Operation Example 1]

Figure 2:
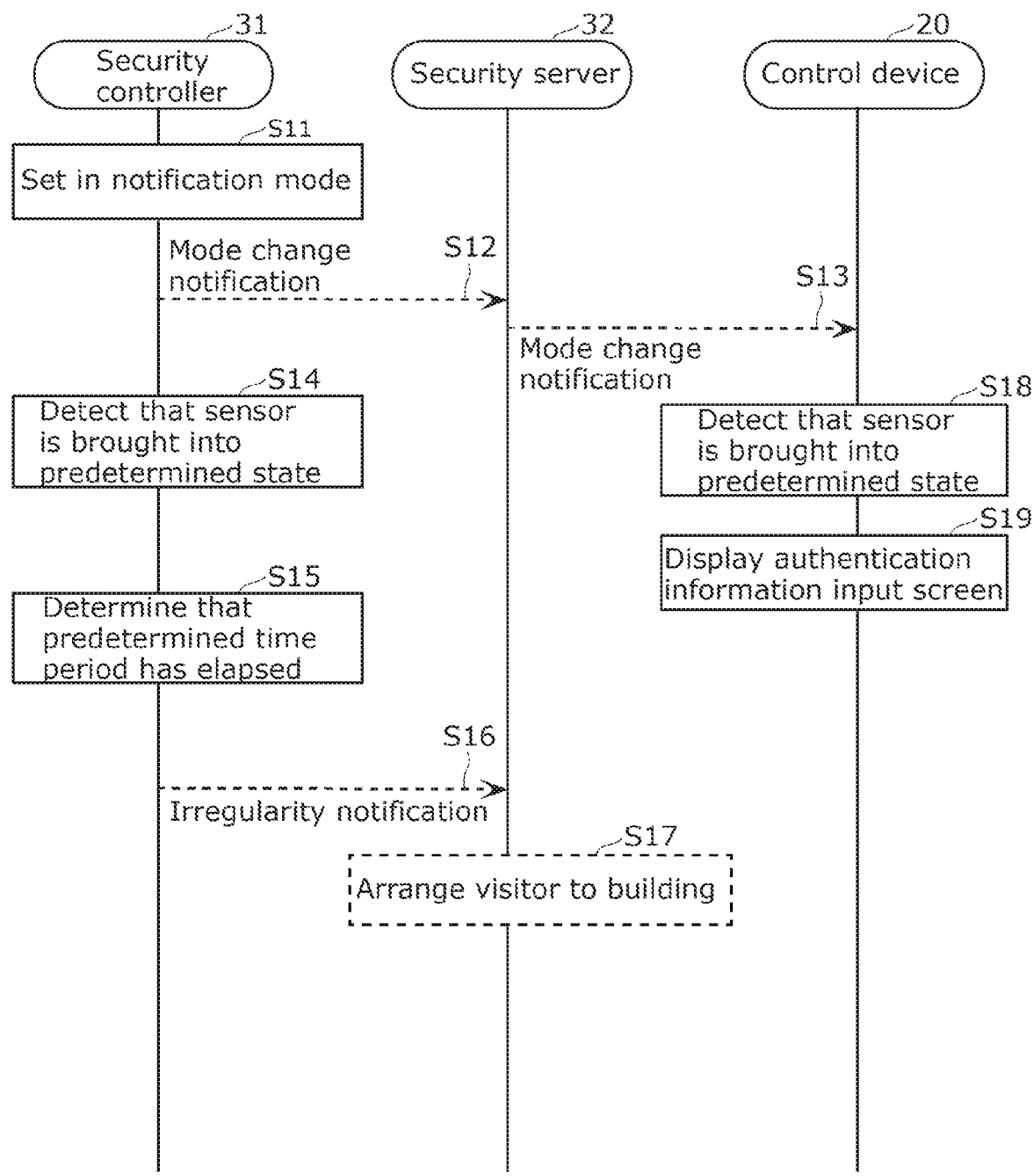
FIG. 2 is a first sequence diagram illustrating operation example 1 of operation performed by the control system according to the embodiment.

Hereinafter, operation example 1 of operation performed by control system 10 will be described. FIG. 2 is a first sequence diagram illustrating operation example 1 of operation performed by control system 10. In the following description, the fact that control device 20 and security controller 31 are provided in the same building 80 (i.e., control device 20 and security controller 31 have a correspondence relationship) is shared in control system 10.

First, security controller 31 is set in the notification mode by receiving a setting of the notification mode from a user (S11). The notification mode is, in other words, an alert mode. The setting of the notification mode is received by, for example, a user interface device (not illustrated) included in security controller 31, but control device 20 may receive the setting of the notification mode.

Security controller 31 transmits a mode change notification indicating that security controller 31 is set in the notification mode (a change from the normal mode to the notification mode) to security server 32 (S12). When security server 32 receives the mode change notification from security controller 31, security server 32 transmits the mode change notification to control device 20 (S13). In other words, security server 32 relays the mode change notification. As a result, the fact that security controller 31 is set in the notification mode is shared among security controller 31, security server 32, and control device 20.

For example, when sensor 33 changes to a predetermined state (S14), and security controller 31 (security system 30) set in the notification mode determines that the setting of the notification mode is not cancelled even a predetermined time period has elapsed since sensors 33 has changed to the predetermined state (S15), security controller 31 transmits an irregularity notification to security server 32 (S16). As a result, a visitor rushes to building 80 (S17). Note that the above-mentioned predetermined state is, in other words, a state in which an intruder other than a user who resides in building 80 is present in building 80. A change in sensor 33 to a predetermined state indicates, for example, a change in electric lock 34 from the locked state to the unlocked state, and a change in open/close sensor 35 for a window from the closed state to the open state, for example.

Incidentally, a user sets security controller 31 in the notification mode when the user leaves building 80, for example. In this case, after the user unlock electric lock 34 of a door upon returning to building 80, the user needs to cancel the setting of the notification mode before the above-mentioned predetermined time period elapses such that the above-mentioned irregularity notification will not be transmitted. The predetermined time period is, to be more specific, a time period more than 0, and is a time period more than or equal to 1 minute and less than or equal to 5 minutes (e.g., 3 minutes).

Likewise, the user sets security controller 31 in the notification mode before the user goes to bed, for example. In this case, if the user forgets to cancel the setting of the notification mode and opens a window after the user gets up, the user needs to cancel the setting of the notification mode before the above-described predetermined time period elapses.

Here, a method of inputting authentication information, such as a password or a personal identification number (PIN) code, to a graphical user interface (GUI) (panel 22) of control device 20 may be exemplified as a method of cancelling the setting of the notification mode. However, in typical control systems, a user needs to operate (i.e., a preliminary operation) the GUI for displaying an authentication information input screen before authentication information is input, and the fact that it takes time to input authentication information is a problem.

Figure 3:
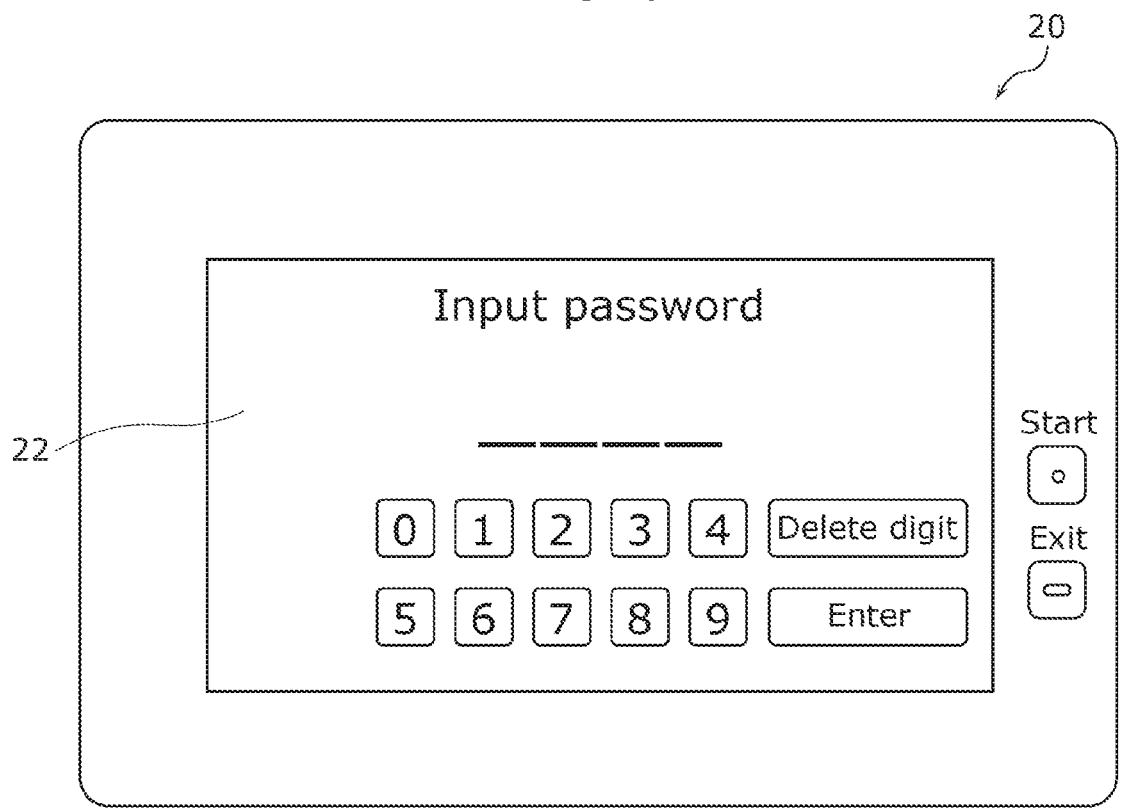
FIG. 3 is a diagram illustrating one example of an authentication information input screen.

In contrast, in control system 10, when controller 24 of control device 20 detects that sensor 33 is brought into the predetermined state (S18) by obtaining the state of sensor 33 via second communicator 27, controller 24 causes panel 22 to display an authentication information input screen (S19). Specifically, after sensor 33 is brought into the predetermined state, controller 24 causes panel 22 to display the authentication information input screen before a user performs some operation on panel 22 (i.e., before panel 22 receives some operation to be performed). In other words, in control system 10, an initially-displayed screen on which user operation is required to be performed after sensor 33 is brought into the predetermined state is the authentication information input screen for cancelling the setting of the notification mode. FIG. 3 is a diagram illustrating one example of the authentication information input screen.

Figure 4:
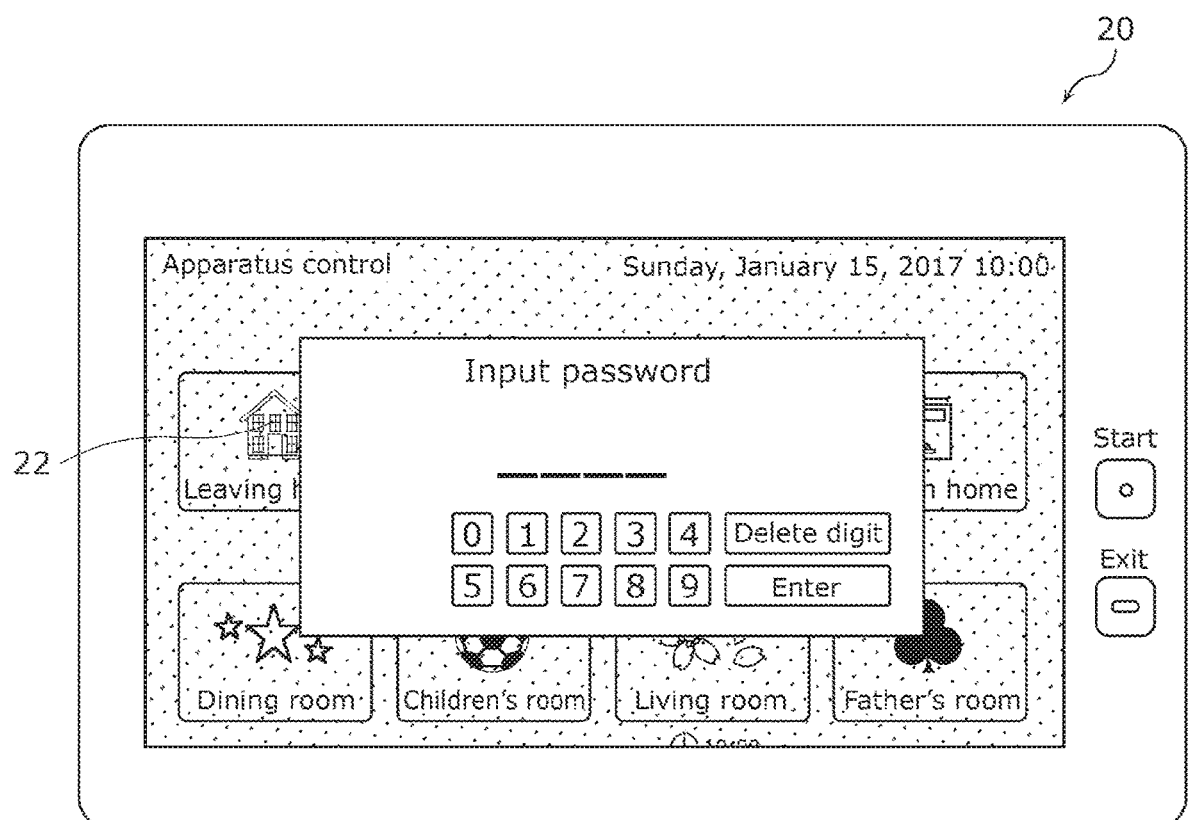
FIG. 4 is a diagram illustrating one example of the authentication information input screen that is superimposed on another screen.

When panel 22 is in the sleep state (black screen), controller 24 activates panel 22 to display the authentication information input screen. Moreover, when panel 22 is displaying another screen, controller 24 displays the authentication information input screen instead of the other screen (i.e., the screen is caused to transition). Controller 24 may superimpose (in other words, pop up) the authentication information input screen on the other screen to display the authentication information input screen. FIG. 4 is a diagram illustrating one example of the authentication information input screen that is superimposed on another screen. The other screen is, for example, a control screen for controlling apparatus 50.

Figure 5:
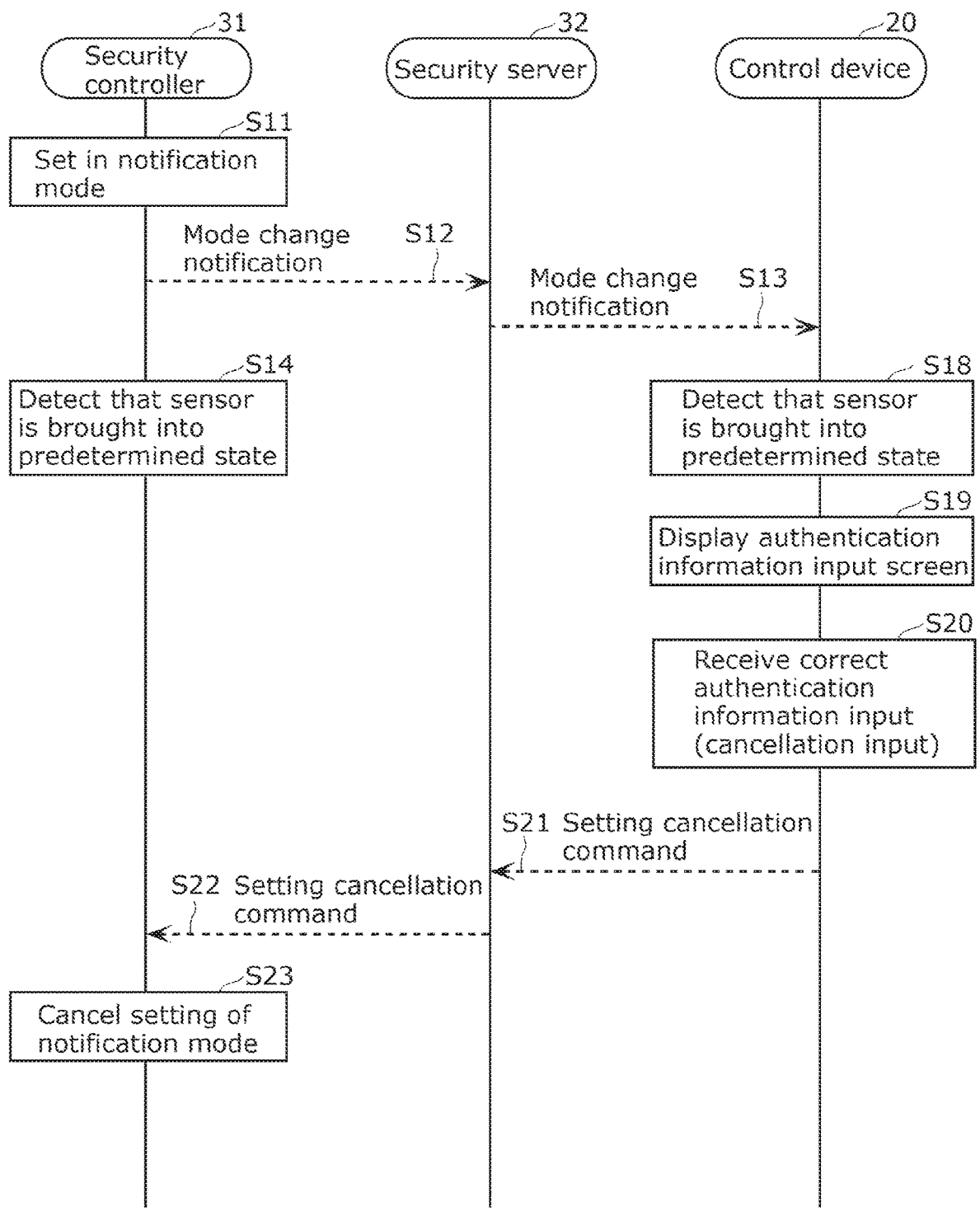
FIG. 5 is a second sequence diagram illustrating operation example 1 of operation performed by the control system according to the embodiment.

As described above, if the authentication information input screen is displayed in response to sensor 33 being brought into a predetermined state, a user can promptly cancel the setting of the notification mode. FIG. 5 is a second sequence diagram illustrating operation example 1 of operation performed by control system 10 when the notification mode is cancelled before an irregularity notification is provided.

Steps S11 through S14, step S18, and step S19 are the same as the steps illustrated in the sequence diagram of FIG. 2. When correct authentication information is input via the input screen displayed in step S19 before a predetermined time period elapses since a timing at which sensor 33 has changed to a predetermined state, panel 22 receives the input (hereinafter, also referred to as a cancellation input) (S20). Note that the state in which the authentication information input screen is displayed is, in other words, a cancellation preparation state in which a cancellation input for cancelling the setting of the notification mode is receivable.

When the cancellation input is received, controller 24 causes first communicator 26 to transmit a setting cancellation command to security server 32 (S21). When security server 32 receives the setting cancellation command from control device 20, security server 32 transmits the setting cancellation command to security controller 31 (S22). In other words, security server 32 relays the setting cancellation command. As a result, security controller 31 cancels the setting of the notification mode (S23). Specifically, controller 24 can cancel the setting of the notification mode by transmitting the setting cancellation command using first communicator 26.

As has been described above, control system 10 causes panel 22 to display the authentication information input screen, before a user performs some operation on panel 22 after sensor 33 is brought into a predetermined state. With this, a user can promptly input the authentication information, and thereby preventing an irregularity notification from being unintentionally provided to security server 32 (preventing a visitor from being unintentionally dispatched to building 80).

[Operation Example 2]

Figure 6:
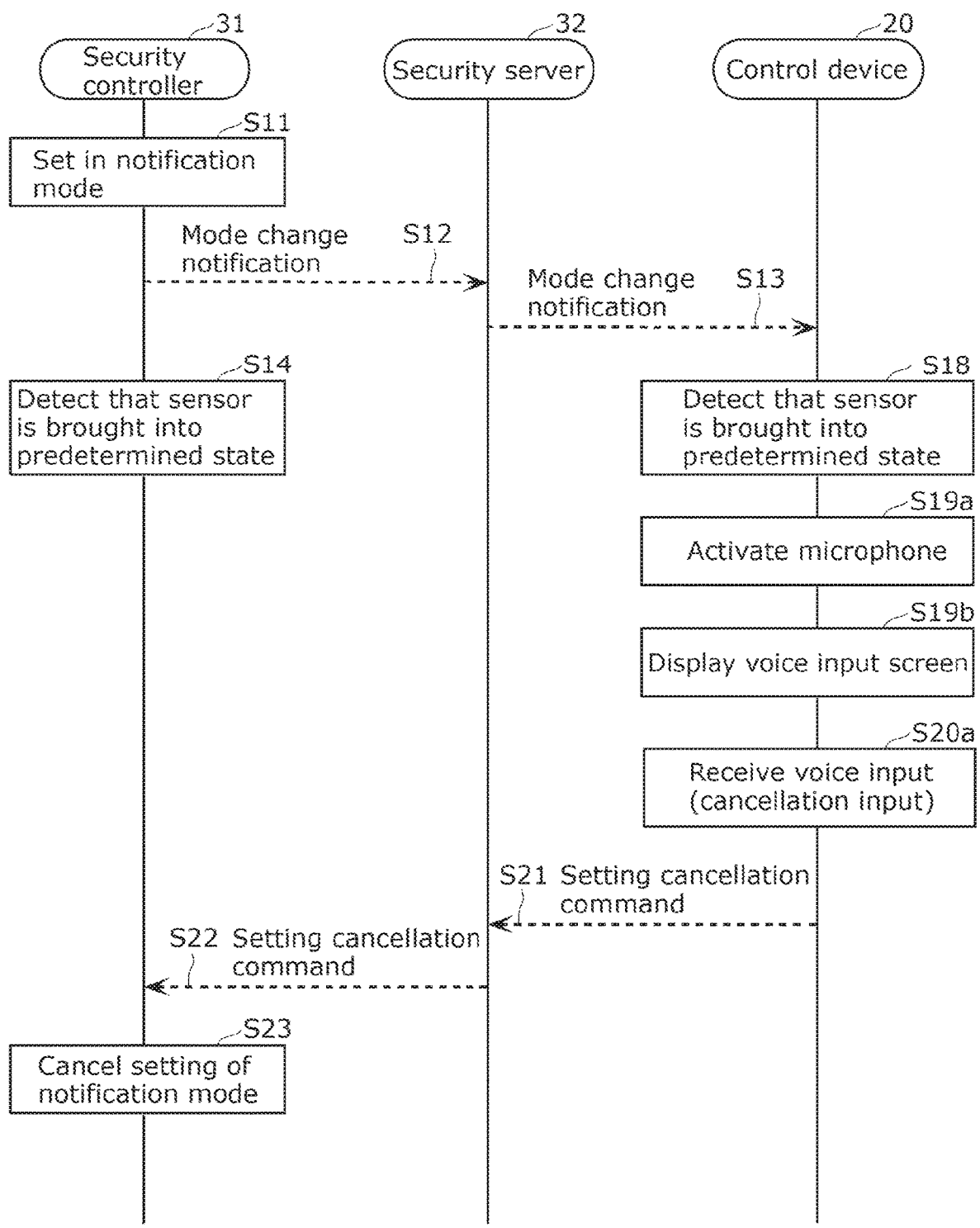
FIG. 6 is a sequence diagram illustrating operation example 2 of operation performed by the control system according to the embodiment.

In operation example 1, the setting of the notification mode is cancelled by a manual input of authentication information; however, the setting of the notification mode may be cancelled by a voice input. FIG. 6 is a sequence diagram illustrating operation example 2 of such operation.

Figure 7:
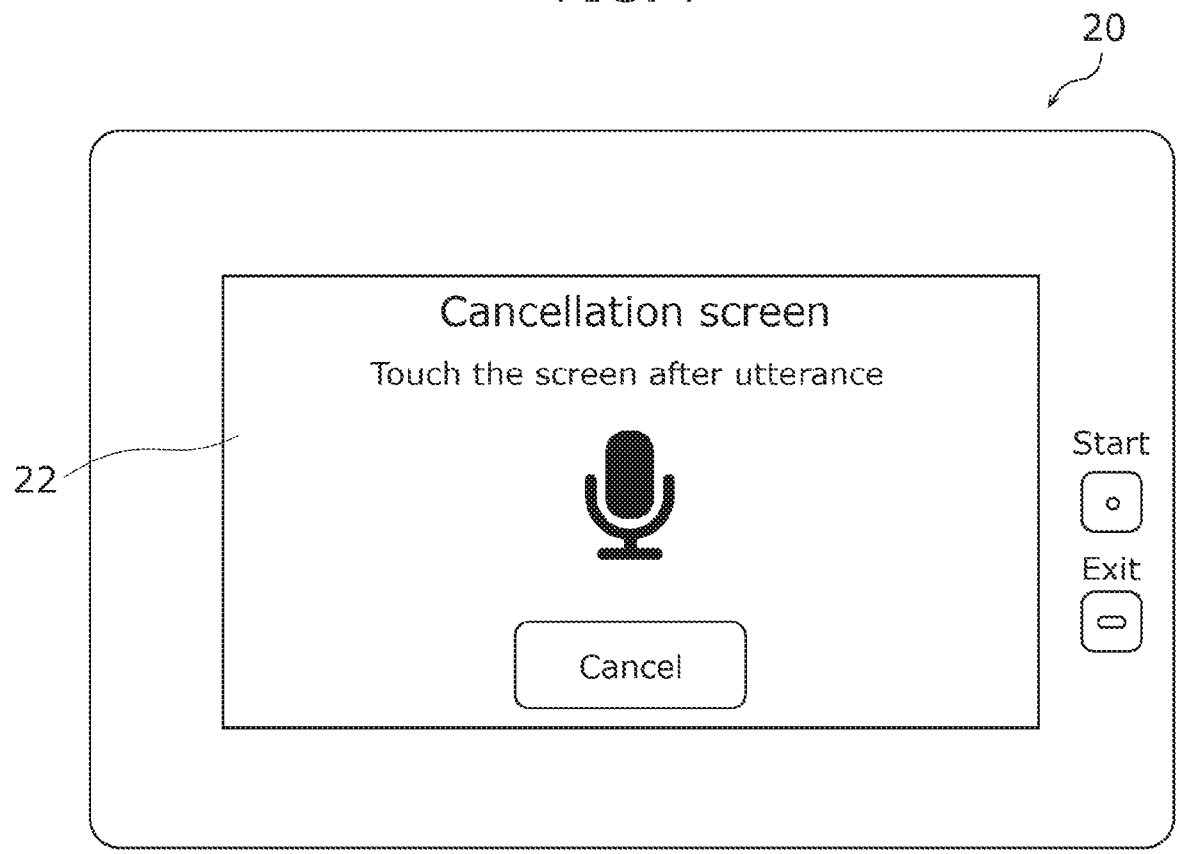
FIG. 7 is a diagram illustrating one example of a voice input screen.

Steps S11 through S14 are the same as the steps described in operation example 1. In parallel with the process performed in step S14, when controller 24 of control device 20 detects that sensor 33 is brought into the predetermined state (S18) by obtaining the state of sensor 33 via second communicator 27, controller 24 activates microphone 23 (S19a) and causes panel 22 to display a voice input screen (S19b). Specifically, after sensor 33 is brought into the predetermined state, controller 24 activates microphone 23 and causes panel 22 to display the voice input screen before a user performs some operation on panel 22 (i.e., before panel 22 receives some operation to be performed). FIG. 7 is a diagram illustrating one example of the voice input screen.

The activation of microphone 23 indicates turning ON of the power of microphone 23 and bringing of microphone 23 into a state capable of obtaining a voice. In this case, controller 24 is brought into a stand-by state capable of performing voice recognition on a voice that is input via microphone 23.

Moreover, when panel 22 is in the sleep state, controller 24 activates panel 22 to display the voice input screen. In addition, when panel 22 is displaying another screen, controller 24 displays the voice input screen instead of the other screen (i.e., the screen is caused to transition). Controller 24 may superimpose (in other words, pop up) the voice input screen on the other screen to display the voice input screen. The other screen is, for example, a control screen for controlling apparatus 50.

When a voice is input via microphone 23 before a predetermined time period elapses since a timing at which sensor 33 has changed to the predetermined state, controller 24 performs voice recognition processing. Controller 24 performs, for example, speaker recognition based on the voice. When controller 24 determines that the speaker is a predetermined user (e.g., a user resides in building 80) whose voice data has been registered, controller 24 allows cancellation of the setting. Moreover, controller 24 may perform word recognition based on the voice, and may determine whether the word spoken by the user is a predetermined password. When controller 24 determines that the word spoken is the predetermined password, controller 24 may allow cancellation of the setting. Note that part or the whole of voice recognition processing may be performed by a voice recognition server that is not illustrated.

As described, when the cancellation input (correct voice input) is received by microphone 23 and controller 24 (S20a), controller 24 causes first communicator 26 to transmit a setting cancellation command to security server 32 (S21). Processes to be performed thereafter are the same as the processes described in operation example 1. Note that a state in which a voice recognition function of microphone 23 and controller 24 is activated and controller 24 is capable of performing the voice recognition processing is, in other words, a cancellation preparation state in which a cancellation input for cancelling the setting of the notification mode is receivable.

As has been described above, in control system 10, controller 24 brings control device 20 into a state in which voice recognition can be performed by, activating microphone 23 etc., before a user performs some operation on panel 22 after sensor 33 is brought into the predetermined state. With this, a user can promptly input a voice for cancelling the notification mode, and thereby preventing an irregularity notification from being unintentionally provided to security server 32 (preventing a visitor from being unintentionally dispatched to building 80).

Incidentally, the voice input screen illustrated in FIG. 7 requires a user to perform an operation on panel 22 after a voice is input. Specifically, as a requirement for cancelling the setting of the notification mode, not only a voice input is required, but also a manual input is required. Accordingly, the setting of the notification mode cannot be cancelled without entering building 80 to operate panel 22. With this, it is possible to prevent cancellation of the setting of the notification mode due to wrongdoing, such as causing control device 20 to recognize a voice spoken from outside building 80.

[Variation]

Information transmission paths described in the above-described embodiments are mere examples. For example, a mode change notification is transmitted from security controller 31 to control device 20 via security server 32; however, the mode change notification may be directly transmitted from security controller 31 to control device 20. In other words, the mode change notification may be transmitted from security controller 31 to each of security server 32 and control device 20.

Moreover, a setting cancellation command is transmitted from control device 20 to security controller 31 via security server 32; however, the setting cancellation command may be directly transmitted from control device 20 to security controller 31. In other words, the setting cancellation command may be transmitted from control device 20 to each of security controller 31 and security server 32.

In addition, in the above-described embodiments, control device 20 independently detects that sensor 33 is brought into a predetermined state. However, this detection may be performed by control device 20 receiving, from security controller 31, a notification indicating that sensor 33 is brought into a predetermined state. In this case, the notification indicating that sensor 33 is brought into the predetermined state may be directly transmitted from security controller 31 to control device 20, or may be transmitted from security controller 31 to control device 20 via security server 32.

Furthermore, in the above-described embodiments, security system 30 is a client-server system including security server 32; however, security system 30 may be a simple system substantially including only security controller 31. In this case, the notification mode may be an operation mode in which security controller 31 issues an alarm (warning beep) inside building 80 when sensor 33 is brought into a predetermined state. As described, a notification provided in the notification mode not only indicates a notification provided to an external device (e.g., an irregularity notification provided to security server 32), but also indicates a notification provided to people inside and in the vicinity of building 80.

Moreover, in the above-described embodiments, processes performed by control device 20 may be performed by, instead of control device 20, mobile terminal 40 having functions equivalent to the functions of control device 20. In other words, in the above-described embodiments, control device 20 may be replaced by mobile terminal 40 as appropriate. For example, mobile terminal 40 may include an input receiver that receives an input from a user, and a controller that, if security system 30 is set in the notification mode in which a notification is provided after a predetermined time period has elapsed since sensor 33 has changed to a predetermined state, brings the input receiver into a cancellation preparation state in which a cancellation input for cancelling a setting of the notification mode is receivable in response to sensor 33 being changed to the predetermined state. With this, a user can cancel the setting of the notification mode of security system 30 using mobile terminal 40. Note that mobile terminal 40 is, specifically, a smartphone or a tablet terminal.

[Advantageous Effects, Etc.]

Control system 10 includes: input receiver 28 that receives an input from a user; and controller 24 that, if security system 30 is set in a notification mode, brings input receiver 28 into a cancellation preparation state in response to sensor 33 being changed to a predetermined state. The notification mode being a mode in which a notification is provided after a predetermined time period has elapsed since sensor 33 has changed to the predetermined state.

The cancellation preparation state being a state in which a cancellation input for cancelling a setting of the notification mode is receivable. Controller 24 cancels the setting of the notification mode when the cancellation input is received by input receiver 28 in the cancellation preparation state.

According to control system 10 as described above, a user need not perform an input, etc. for bringing input receiver 28 into the cancellation preparation state. Therefore, a user can promptly perform a cancellation input. In other words, control system 10 can assist a user in promptly inputting authentication information for cancelling the setting of the notification mode. Moreover, in the above-described control system 10, it is possible to omit a process (e.g., detection of operation by panel 22) that takes place when a user performs an operation etc. to bring input receiver 28 into the cancellation preparation state. In other words, control system 10 can reduce an amount of information processing.

Moreover, for example, input receiver 28 includes panel 22 including a display function, and a touch input function that receives a manual input from the user as the cancellation input. Controller 24 causes panel 22 to display an authentication information input screen for cancelling the setting of the notification mode to bring input receiver 28 into the cancellation preparation state.

Control system 10 as described above can assist a user in promptly inputting authentication information for cancelling the setting of the notification mode.

In addition, for example, input receiver 28 includes microphone 23 that receives a voice input from the user as the cancellation input, and controller 24 activates microphone 23 to bring input receiver 28 into the cancellation preparation state.

Control system 10 as described above can assist a user in promptly providing a voice input for cancelling the setting of the notification mode.

Furthermore, for example, sensor 33 is electric lock 34, and the predetermined state is an unlocked state.

Control system 10 as described above can bring input receiver 28 into the cancellation preparation state in response to electric lock 34 being changed from the locked state to the unlocked state.

Moreover, for example, sensor 33 is open/close sensor 35, and the predetermined state is a state in which an opening (e.g., a window or a door) at which open/close sensor 35 is provided is open.

Control system 10 as described above can bring input receiver 28 into the cancellation preparation state in response to an opening at which electric lock 35 is provided being changed from the closed state to the open state.

In addition, a control method to be executed by a computer, such as control system 10, includes: if security system 30 is set in a notification mode, bringing input receiver 28 that receives an input from a user into a cancellation preparation state in response to sensor 33 being changed to a predetermined state, the notification mode being a mode in which a notification is provided after a predetermined time period has elapsed since sensor 33 has changed to the predetermined state, the cancellation preparation state being a state in which a cancellation input for cancelling a setting of the notification mode is receivable; and cancelling the setting of the notification mode when the cancellation input is received by input receiver 28 in the cancellation preparation state.

According to the control method as described above, a user need not perform an input for bringing input receiver 28 into the cancellation preparation state. Therefore, a user can promptly perform a cancellation input. In other words, control system 10 can assist a user in promptly inputting authentication information for cancelling the setting of the notification mode.

[Other Embodiments]

The foregoing has described embodiments, yet the present invention is not limited to the above-described embodiments.

Moreover, although the control system is realized by a plurality of devices in the above-described embodiments, the control system may be realized as a single device. For example, the control system may be realized as a single device equivalent to the control device, or as a single device equivalent to a mobile terminal that performs the same processing as the control device. When the control system is realized by a plurality of devices, structural elements included in the control system may be allotted to the plurality of devices in any manner.

For example, a communication method to be employed between devices in the above-described embodiments is not particularly limited. Moreover, a relay device that is not illustrated may be interposed between the devices for communication.

In addition, in the above-described embodiments, a process performed by a particular processor may be performed by another processor. In addition, the order of a plurality of processes may be changed, and the plurality of processes may be performed in parallel. Moreover, operation example 1 and operation example 2 according to the above-described embodiments and variation may be optionally combined.

Furthermore, in the above-described embodiments, each of the structural elements may be implemented by executing a software program suitable for the structural element. Each structural element may be realized as a result of a program execution unit, such as a central processing unit (CPU), processor or the like, loading and executing a software program stored in a storage medium such as a hard disk or a semiconductor memory.

Moreover, each structural element may be realized by a hardware product. For example, each structural element may be a circuit (or an integrated circuit). These circuits may constitute a single circuit as a whole or may be individual circuits. Moreover, these circuits may be general-purpose circuits or dedicated circuits.

Note that general or specific aspects of the present invention may be realized by a system, a device, a method, an integrated circuit, a computer program, or a computer-readable recording medium such as a CD-ROM. The general or specific aspects of the present invention may also be realized by an optional combination of a system, a device, a method, an integrated circuit, a computer program, and a recording medium.

For example, the present invention may be realized as (i) a control method to be executed by a computer such as a control system, (ii) a program for causing a computer to execute the above-mentioned control method, or (iii) a non-transitory computer-readable recording medium on which the above-mentioned program is recorded.

The present invention also encompasses: embodiments achieved by applying various modifications conceivable to those skilled in the art to each embodiment; and embodiments achieved by optionally combining the structural elements and the functions of each embodiment without departing from the essence of the present invention.

[Reference Signs List]
- 10 control system
- 22 panel
- 23 microphone
- 24 controller
- 28 input receiver
- 30 security system
- 33 sensor
- 34 electric lock
- 35 open/close sensor
- 40 mobile terminal

The invention claimed is:

1. A control system comprising:
an input receiver that receives an input from a user; and
a controller that, if a security system is set in a notification mode, brings the input receiver into a cancellation preparation state in response to a sensor being changed to a predetermined state, the notification mode being a mode in which a notification is provided after a predetermined time period has elapsed since the sensor has changed to the predetermined state, the cancellation preparation state being a state in which a cancellation input for cancelling a setting of the notification mode is receivable, wherein
the controller cancels the setting of the notification mode when the cancellation input is received by the input receiver in the cancellation preparation state,
the sensor is an electric lock, and
the predetermined state is an unlocked state.

2. The control system according to claim 1, wherein
the input receiver includes a panel including a display function, and a touch input function that receives a manual input from the user as the cancellation input, and
the controller causes the panel to display an authentication information input screen for cancelling the setting of the notification mode to bring the input receiver into the cancellation preparation state.

3. The control system according to claim 1, wherein
the input receiver includes a microphone that receives a voice input from the user as the cancellation input, and
the controller activates the microphone to bring the input receiver into the cancellation preparation state.

4. A control method to be executed by a computer, the control method comprising:
if a security system is set in a notification mode, bringing an input receiver that receives an input from a user into a cancellation preparation state in response to a sensor being changed to a predetermined state, the notification mode being a mode in which a notification is provided after a predetermined time period has elapsed since the sensor has changed to the predetermined state, the cancellation preparation state being a state in which a cancellation input for cancelling a setting of the notification mode is receivable; and
cancelling the setting of the notification mode when the cancellation input is received by the input receiver in the cancellation preparation state,
wherein the sensor is an electric lock, and
the predetermined state is an unlocked state.

5. A non-transitory computer-readable recording medium for use in a computer, the recording medium having a computer program recorded thereon for causing the computer to execute the control method according to claim 4.

* * * * *